US009287997B2

(12) United States Patent
Dudek et al.

(10) Patent No.: US 9,287,997 B2
(45) Date of Patent: Mar. 15, 2016

(54) REMOVING NETWORK DELAY IN A LIVE BROADCAST

(71) Applicant: International Business Machines Corporation, Armonk, NY (US)

(72) Inventors: Clark A. Dudek, Raleigh, NC (US); Phillip D. Jones, Raleigh, NC (US); Eric Woods, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 725 days.

(21) Appl. No.: 13/626,640

(22) Filed: Sep. 25, 2012

(65) Prior Publication Data

US 2014/0086430 A1 Mar. 27, 2014

(51) Int. Cl.

*G06F 17/00* (2006.01)
*H04H 20/10* (2008.01)
*H04H 60/07* (2008.01)

(52) U.S. Cl.

CPC ............... *H04H 20/10* (2013.01); *H04H 60/07* (2013.01)

(58) Field of Classification Search

CPC ............................... H04H 20/10; H04H 60/07
See application file for complete search history.

(56) References Cited

U.S. PATENT DOCUMENTS

| | | | | |
|---|---|---|---|---|
| 6,377,590 | B1 * | 4/2002 | Hoppal et al. | 370/528 |
| 6,985,966 | B1 * | 1/2006 | Gupta et al. | 709/248 |
| 7,542,897 | B2 | 6/2009 | Hutchison et al. | |
| 7,809,388 | B1 | 10/2010 | Othmer | |
| 7,822,050 | B2 | 10/2010 | DeGrazia | |
| 2003/0035072 | A1 * | 2/2003 | Hagg | H04H 20/10 348/729 |
| 2004/0093263 | A1 | 5/2004 | Doraisamy et al. | |
| 2004/0267952 | A1 * | 12/2004 | He et al. | 709/231 |
| 2006/0257840 | A1 | 11/2006 | Risch et al. | |
| 2014/0088745 | A1 | 3/2014 | Dudek et al. | |

FOREIGN PATENT DOCUMENTS

CN 103686220 A 3/2014

OTHER PUBLICATIONS

Bernsee., “Time Stretching and Pitch Shifting of Audio Signals—An Overview: The DPS Dimension”. Tutorial. Aug. 18, 1999. [online] Retrieved from the internet:<http://www.dspdimension.com/admin/time-pitch-overview/>. Copyright 2012.

* cited by examiner

*Primary Examiner* — Fan Tsang
*Assistant Examiner* — Eugene Zhao
(74) *Attorney, Agent, or Firm* — David Zwick; Ryan Lewis

(57) ABSTRACT

A first stream of audio data is received a into a data store. Excess pauses are identified in the audio data. A second stream of audio data is transmitted from the data store comprising the first stream of audio data with the excess pause removed, the second stream of audio data transmitted after a delay that is approximately equal to but no less than the duration of the removed excess pause.

8 Claims, 6 Drawing Sheets

REMOVING NETWORK DELAY IN A LIVE BROADCAST

FIELD OF THE INVENTION

The present invention relates generally to the field of voice communication, and more particularly to removing network delay effects during a "live" broadcast.

BACKGROUND OF THE INVENTION

In live television and radio interviews between parties that are not both located in the same broadcast studio, there can be a noticeable delay between when the interviewer finishes asking a question and when the interviewee begins answering, as seen from the perspective of the interviewer. In normal conversation, delays of 200 milliseconds (ms) or less between a question and an answer are typical. As the delay increases, it becomes noticeable to a third party listening to the conversation, and the flow of the exchange begins to sound unnatural. Depending on the communication technology used, "in the field" interviews can experience delays of several seconds between a question and the response.

SUMMARY

Embodiments of the present invention disclose a method, computer program product, and system for removing excess pauses in a live broadcast caused by network delays. A first stream of audio data is received a into a data store. Excess pauses are identified in the audio data. A second stream of audio data is transmitted a from the data store comprising the first stream of audio data with the excess pause removed, the second stream of audio data transmitted after a delay that is approximately equal to, but no less than, the duration of the removed excess pause.

DETAILED DESCRIPTION

Figure 1:
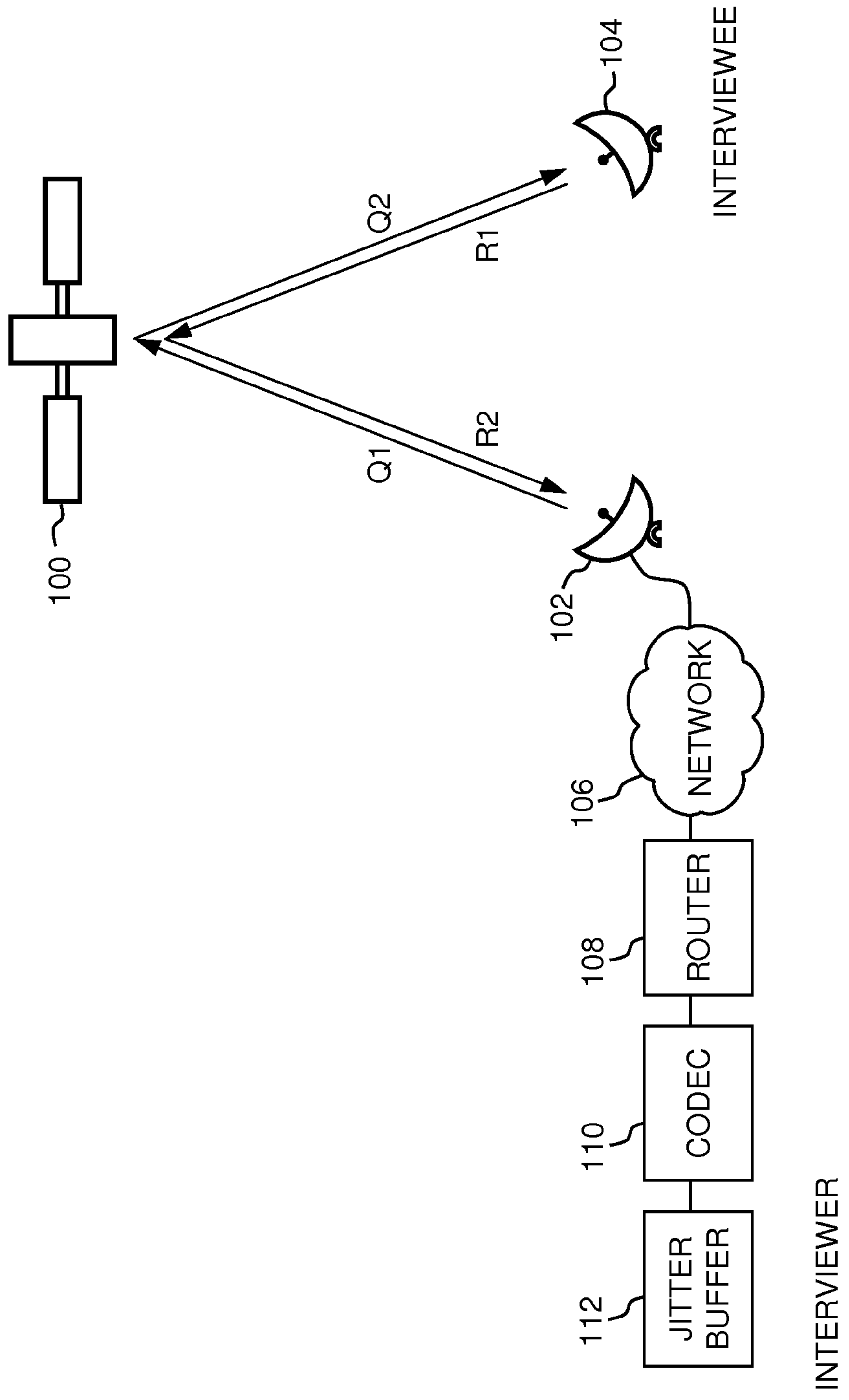
FIG. 1 is a diagram illustrating certain components in an example system in which interview delays are experienced.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer-program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices, to cause a series of operational steps to be performed on the computer, other programmable apparatus, or other devices to produce a computer-implemented process such that the instructions, which execute on the computer or other programmable apparatus, provide processes for implementing the functions/acts specified in the flowchart and/or block diagram block or blocks.

The present invention will now be described in detail with reference to the Figures. FIG. 1 is a diagram illustrating certain components in an example system in which interview delays are experienced. In the example system, an interviewer, for example, in a television broadcast studio, is conducting a live interview with an interviewee who is "in the field," for example, via a mobile satellite truck. All components in the communication path between the interviewer and the interviewee introduce transmission delays. In live broadcast interviews, these delays typically manifest as a delay between when an interviewer in a broadcast studio finishes asking a question, and when the interviewer begins to hear the response. Many delays are typically unnoticeable. For example, electrical signals on a coaxial cable travel at about 80% of the speed of light. For earthbound systems, these delays are typically very small. The delay in an audio signal through air, which is about a million times slower than the signal speed on a coaxial cable, is also typically unnoticeable. However, other components in the communication path can introduce noticeable delays.

The example system illustrated in FIG. 1 shows a geosynchronous communications satellite 100, satellite dish 104 located near the interviewee, satellite dish 102 located near the broadcast studio, network 106, router 108, coder-decoder (codec) 110, and jitter buffer 112. As illustrated, a first element that can introduce delay is satellite 100. The minimum round trip time for a signal between satellite dish 102 and satellite 100, i.e., the time for a pulse to be transmitted up to satellite 100 and reflected back, is about 250 ms. This is governed by the speed of light. In the context of an interview, this delay is doubled because there is a first delay when the question is transmitted, indicated as paths Q1 and Q2, and a second delay when the answer is transmitted, indicated as paths R1 and R2. Thus, the delay introduced by satellite 100 is about 500 ms. Additional delays may be introduced by satellite-to-satellite transmissions, and delays cause by packet handling and queuing at the ground stations and satellite 100.

In the example system, network 106 is a packet-based network, such as a TCP/IP network. Transmission delays can be introduced in network 106 by network congestion, which can cause packet queuing and rerouting, and also simply by the time it takes to transmit a full packet. Transmission delays can be introduced by router 108, for example, processing delays in the time it takes to read and process packet headers. Transmission delays can be introduced by codec 110. For example, if codec 110 uses a compression algorithm to reduce network traffic, there will be a delay caused by the processing time it takes codec 110 to apply the compression algorithm, and a similar delay at the other end of the network when the data is decompressed by a second codec. Codec 110 can also cause delays because a certain amount of buffering of incoming data may be required in order to perform data compression. Jitter buffer 112 can cause delays by buffering received packets that arrive with a variable delay, and playing them out with a fixed amount of delay. If the extent of the variable delay between received packets is small, then the jitter buffer does not have to be very deep. There can be many other sources of network delay in a broadcast network, and many more discrete components than are shown in the example system of FIG. 1.

Figure 2:
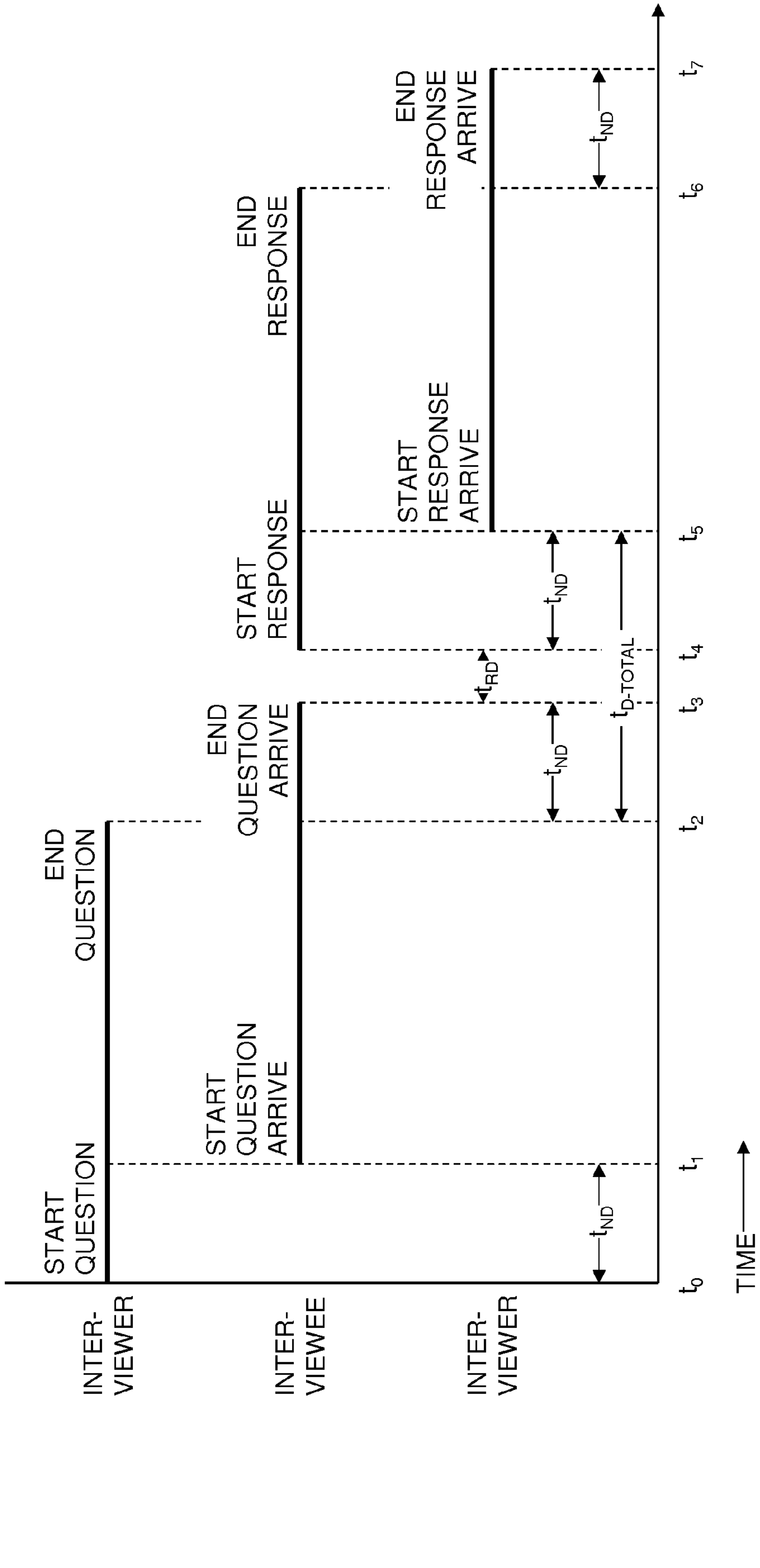
FIG. 2 is a message flow diagram illustrating where the effects of network induced delays may be observed during a live broadcast interview.

FIG. 2 is a message flow diagram illustrating where the effects of network induced delays may be observed during a live broadcast interview. At time $t_0$, the interviewer starts asking an interview question. At time $t_1$, the interviewee receives the beginning of the question. The interval $t_1$-$t_o$ is network delay $t_{ND}$, which is caused, for example, by the delays described with respect to FIG. 1. At time $t_2$, the interviewer finishes the question, and, after network delay $t_{ND}$, at $t_3$ the interviewee receives the end of the question.

At time $t_4$, after a response delay $t_{RD}$, the interviewee begins responding to the question. From the interviewee's perspective, the delay $t_{RD}$ in responding to the question seems natural because the effects of the network delay aren't observed by the interviewee at this point in the conversation.

At time $t_5$, after response delay $t_{RD}$ and another network delay $t_{ND}$, the start of the interviewee's response arrives back through the network to the interviewer. From the interviewer's perspective, the total delay $t_{D\text{-}TOTAL}$ between the time the interviewer's question completes at time $t_2$, and the response from the interviewee is first received at time $t_5$, is equal to twice the network delay $t_{ND}$ plus the natural response delay $t_{RD}$. Because live interviews are typically broadcast from the interviewer's location, listeners to the broadcast will typically perceive the same delays experienced by the interviewer. At time $t_6$, the interviewee finishes the response, and at time $t_7$, after network delay $t_{ND}$, the interviewer receives the end of the response.

Figure 3:
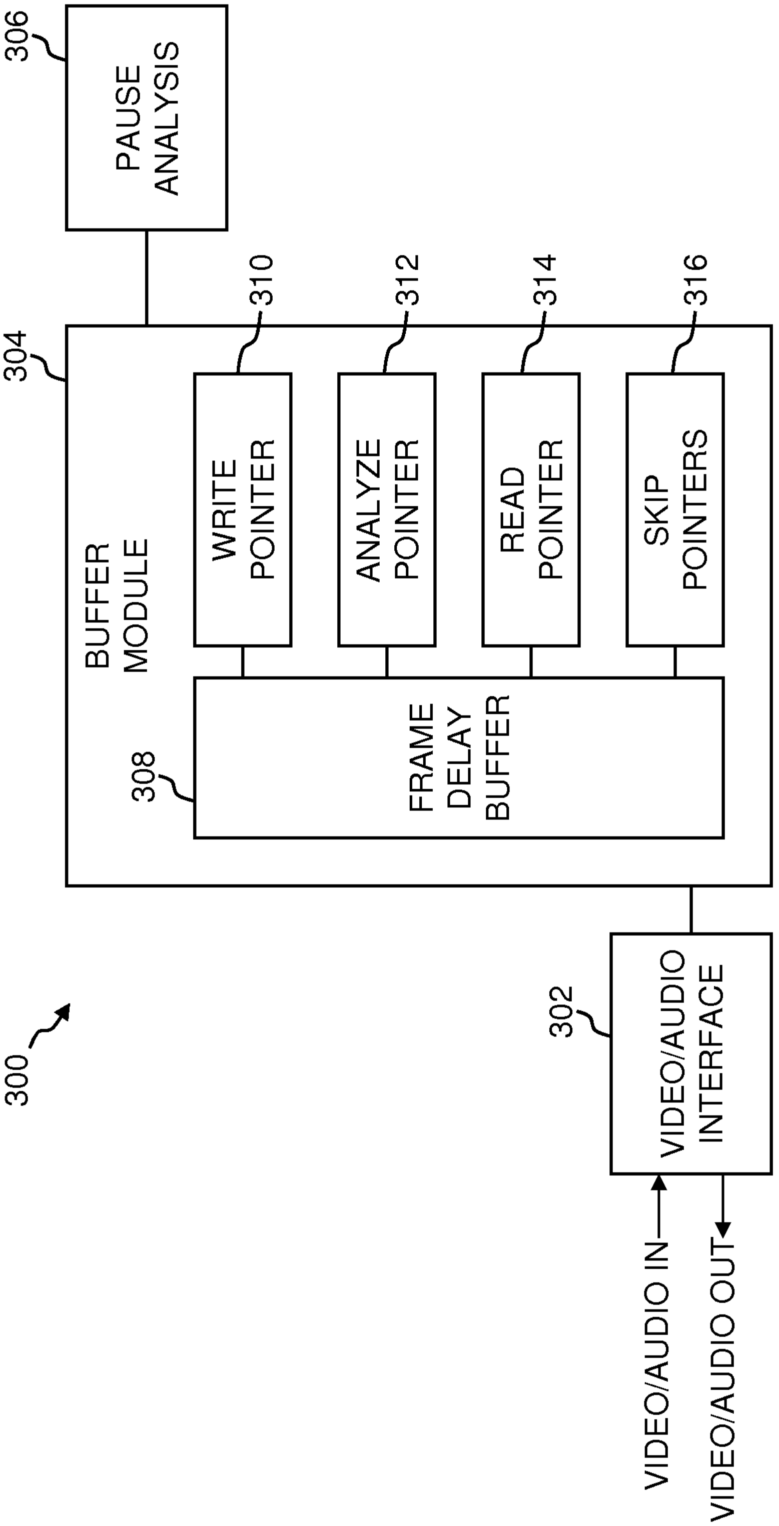
FIG. 3 is a block diagram of components of a live broadcast skip delay system, in accordance with an embodiment of the present invention.

FIG. 3 is a block diagram of functional components of a live broadcast skip delay system 300, in accordance with an embodiment of the present invention. Live broadcast skip delay system 300 includes video/audio interface 302, buffer module 304, and pause analysis program 306. In preferred embodiments, video/audio interface 302 accepts a video or audio frame stream over a video or audio input channel, parses the frames in accordance with a video or audio frame protocol, which could be, for example, a TCP/IP based network protocol or a digital video broadcast protocol, and makes the frame stream available to buffer module 304. Video/audio interface 302 also accepts a frame stream from buffer module 304, packetizes the frames in accordance with a network protocol, and transmits the frame stream onto a network over a video/audio out channel.

Buffer module 304 includes frame delay buffer 308, write pointer 310, analyze pointer 312, read pointer 314, and skip pointers 316. Buffer module 304, which will be explained in greater detail below, receives a frame stream from video/audio interface 302 into frame delay buffer 308, in accordance with write pointer 310. The received data is analyzed by pause analysis program 306, in accordance with analyze pointer 312, to identify excessive pauses. If excessive pauses are found, pause analysis program 306 creates a skip pointer 316. Frame data is read out of frame delay buffer 308, in accordance with read pointer 314, into video/audio interface 302 for broadcast transmission over the video/audio out channel. If read pointer 314 encounters a frame delay buffer 308 address associated with a skip pointer 316, the read pointer skips ahead to the buffer address indicated by the skip pointer, thus skipping over excessive pauses in the frame data. To avoid sudden video or audio transitions, certain embodiments can use a fade technique to transition between the frames on each side of the skip.

Pause analysis program 306 receives the video or audio frame stream from frame delay buffer 308, in accordance with analyze pointer 312, and identifies data frames that contain pauses. For example, if the amplitude of audio data in a data frame does not exceed an amplitude threshold value, the frame can be classified as a pause frame. If a series of contiguous pause frames results in a pause that has a duration longer than a predefined value, for example, 500 ms, pause analysis program 306 creates a skip pointer 316. In an exemplary embodiment, a skip pointer 316 links the address of the first pause frame after 500 ms of contiguous pause frames to the address of the first data frame after the contiguous pause frames that contains audio data with an amplitude greater than the amplitude threshold value. As data is read out of frame delay buffer 308, if read pointer 314 encounters a frame delay buffer address having an associated skip pointer 316, then the read pointer is advanced to the address indicated by the skip pointer, after which the skip pointer is cleared.

Figure 4A:
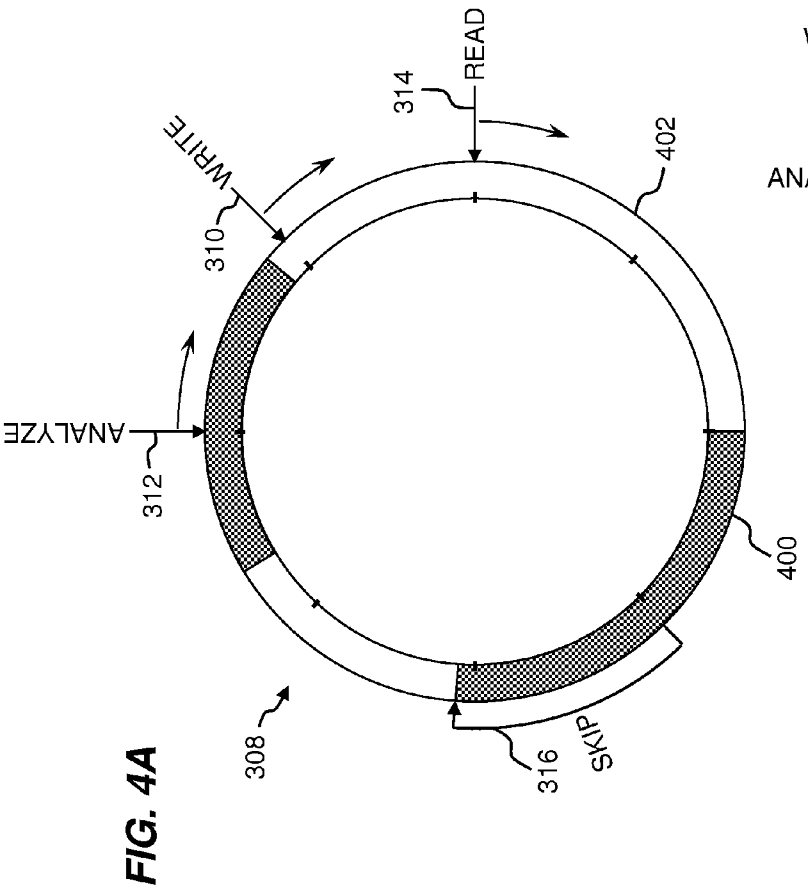
FIGS. 4A and 4B are diagrams illustrating two characterizations of the frame delay buffer of FIG. 3, in accordance with an embodiment of the present invention.
Figure 4B:
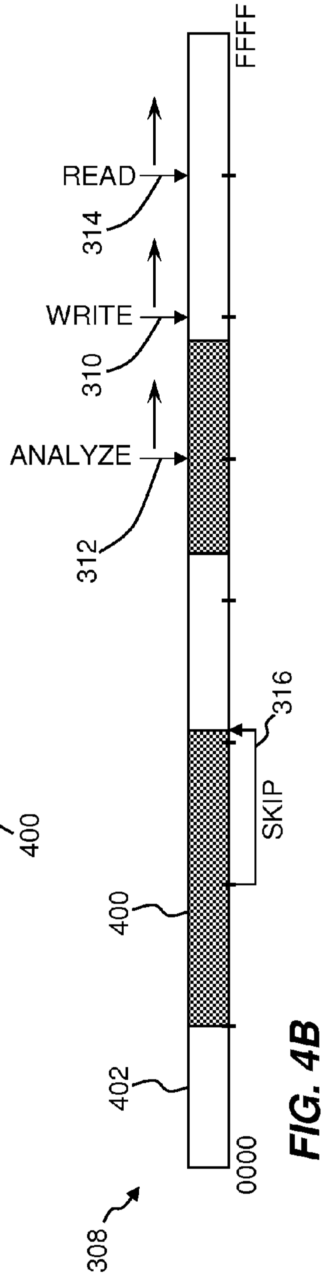

FIGS. 4A and 4B are diagrams illustrating two characterizations of frame delay buffer 308, in accordance with an embodiment of the present invention. FIG. 4A illustrates frame delay buffer 308 logically as a circular buffer; FIG. 4B illustrates a physical representation in memory of frame delay buffer 308. In exemplary embodiments of the invention, uncompressed video or audio data frames is streamed into frame delay buffer 308. Contiguous frames are identified by pause analysis program 306 as containing pause frames, for example, portion 400 of the frame delay buffer contents, or speech frames, for example, portion 402 of the frame delay buffer contents. If contiguous pause frames 400 result in a pause longer than a predetermined typical response delay, a skip pointer 316 is created by pause analysis program 306 that directs read pointer 314 to skip ahead and bypass a portion of pause frames 400 such that the response delay perceived by a listener will be the predetermined typical response delay.

Figure 6:
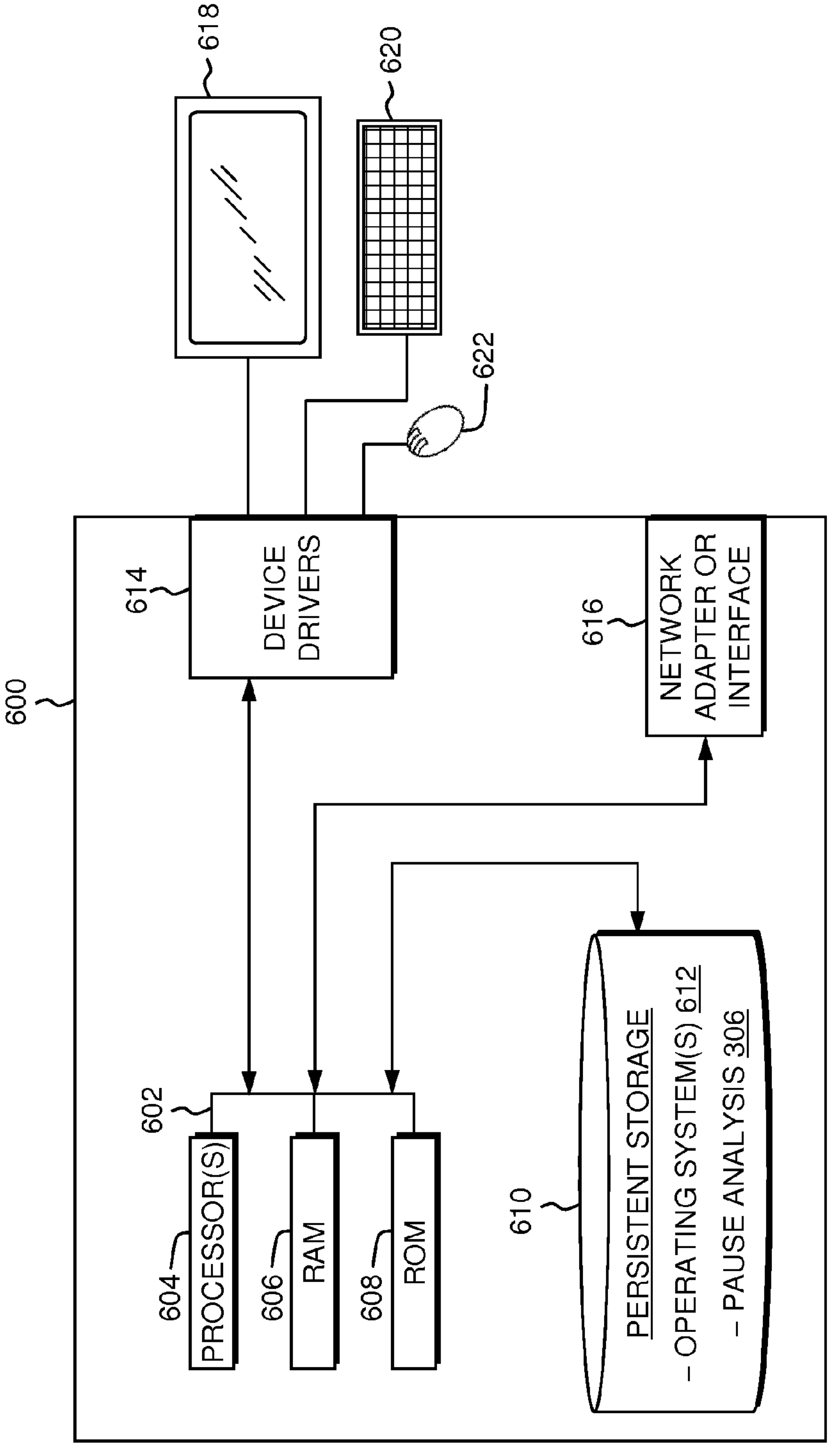
FIG. 6 illustrates a block diagram of a computing system in which the live broadcast skip delay system of FIG. 1 may be implemented, in accordance with an embodiment of the present invention.

In exemplary embodiments, frame delay buffer 308 is a portion of bit addressable random access memory, for example, a portion of RAM 606 (see FIG. 6). The minimum length of frame delay buffer 308 will depend on the length of individual audio or video frames, the frame rate, and the expected maximum total pause delay in live interview broadcast segments of a broadcast program. As an example, live broadcast skip delay system 300 may be used primarily during live interview segments of a news hour production. Each interview segment is about three minutes long, and has no more than about ten question—response exchanges. The longest network delay between the question and response is about three seconds, and the desired delay is one-half second. Thus, frame delay buffer 308 should be able to store a minimum of about 25 seconds of broadcast frames. In this example, as the broadcast frames are streamed into and read from frame delay buffer 308, each question—response exchange results in a skip ahead in the frame delay buffer by about 2.5 seconds. If the live interview segment has the maximum ten question—response exchanges, then 25 seconds of delay will be removed from frame delay buffer 308 through use of the skip pointers 316, which in this example, is the full extent of the buffer. In certain embodiments, an additional delay can be introduced via frame delay buffer 308 to allow for processing time required by pause analysis program 306 to process the data frames in the frame delay buffer, determine skip addresses, and create the skip pointers 316. Frame delay buffer 308 can be much longer than is needed for a particular live interview segment, in which case only a portion of the frame delay buffer will be used. For illustrative purposes, frame delay buffer 308 as shown in FIG. 4A has tick marks on the inner edge, and as shown in FIG. 4B along the bottom edge, that separate the frame delay buffer into eight parts corresponding to, for example, time intervals, such as seconds; and, as illustrated in FIG. 4B, the buffer begins at address 0x0000 and extends to address 0xFFFF.

In the exemplary embodiment, write pointer 310 and analyze pointer 312 are advanced in frame delay buffer 308 towards higher addresses at a rate that is effectively the rate that frame data is received into video/audio interface 302. Read pointer 314 is also generally advanced at this same rate, except for when the read pointer is skipped over pause frames within frame delay buffer 308. However, in some embodiments, the rate that data is read from the frame delay buffer can be faster or slower with respect to rate at which write pointer 310 is advanced. In a preferred embodiment, frame delay buffer 308 is a "circular" buffer, such that as each pointer is advanced to the end of the frame delay buffer, as indicated by address 0xFFFF, the pointer is reset to the beginning address, indicated by address 0x0000, or another address offset from the beginning address within the frame delay buffer. Logically, read pointer 314 trails analyze pointer 312, which trails write pointer 310. The number of frames by which read pointer 314 trails write pointer 310 at a specific time determines the broadcast delay introduced by live broadcast skip delay system 300, and the amount of total pause frame delay that can be skipped through the use of skip pointers 316.

Figure 5:
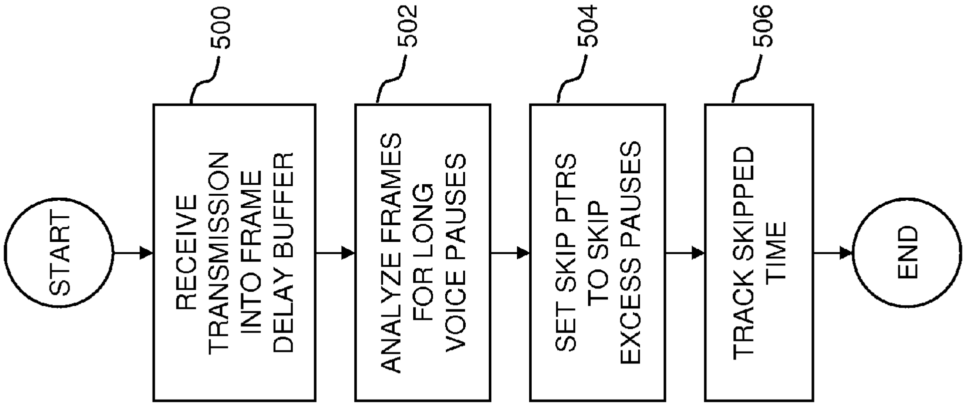
FIG. 5 is a flowchart depicting operational steps of a live broadcast skip delay system for removing perceived network delays in a live broadcast, in accordance with an embodiment of the present invention.

FIG. 5 is a flowchart depicting operational steps of live broadcast skip delay system 300, in accordance with an embodiment of the present invention. Uncompressed video or audio data frames are streamed into frame delay buffer 308 (step 500). Contiguous frames are identified by pause analysis program 306 as containing pause frames or speech frames. When contiguous pause frames 400 result in a pause longer than a predetermined response delay (step 502), skip pointers 316 are created by the pause analysis program 306 that directs read pointer 314 to skip ahead and bypass a portion of pause frames 400 such that the response delay perceived by a listener will be the predetermined typical response delay (step 504). Buffer times, such as the initial delay introduced by frame delay buffer 308, and the amount of time skipped as a result of skip pointers 316, are tracked (step 506) and made available to other components in the broadcast system.

Live broadcast skip delay system 300 can be integrated into a broadcast system in several ways. For example, many broadcast systems include a censorship delay component to allow certain words to be "bleeped" out. Broadcast systems can also include a "time stretching" component that "compresses" or "decompresses" the broadcast data to, in effect, lengthen or shorten the broadcast segment. Adjustments are made to the audio content so that, for example, voices or music don't sound higher or lower in pitch. Live broadcast skip delay system 300 can be placed, for example, either before or after either of these components.

A time stretching component and live broadcast skip delay system 300 can work in concert to manage the delay introduced by the live broadcast skip delay system. For example, in certain embodiments, if a live interview segment is part of a 30 minute broadcast program, an estimate can be made of the maximum total question-response delay that will be removed, for example, 45 seconds. Thus, prior to broadcasting the live interview segment, 45 seconds of broadcast delay need to be accumulated in frame delay buffer 308 so as to allow for the estimated 45 seconds maximum total question-response delay to be skipped by live broadcast skip delay system 300. The estimated delay can be accumulated in frame delay buffer 308 by, for example, streaming the broadcast data into the frame delay buffer while actually broadcasting 45 seconds of commercials, then reading out of the frame delay buffer after the commercials have ended. The 45 seconds of commercials can be broadcast at the start of the minute broadcast program, or can be broadcast at different times prior to the start of the live interview segment. If the total question-response delay of the live interview segment is less than the estimate, the time stretching component can be used to compress the excess delay from the broadcast data by, for example, accelerating read pointer 314 such that the broadcast program ends at the 30 minute mark.

In alternative embodiments, uncompressed data frames are streamed into frame delay buffer 308 at the normal broadcast rate. The data frames are read out of frame delay buffer 308 at a slower rate such that by the time that the live interview segment of the broadcast program is ready to air, a delay has been introduced into the broadcast sufficient to allow for skipping the estimated total maximum question-response delay caused by network delay. For example, it is estimated that a live interview segment of a broadcast program can have up to 45 seconds of question-response delay caused by network delay. At the beginning of the broadcast, uncompressed data frames are streamed into frame delay buffer 308 at the normal broadcast rate, in accordance with write pointer 310. The data frames are read out of frame delay buffer 308 for broadcast in accordance with read pointer 314, which initially trails write pointer 310 by a minimal amount. Because read pointer 314 is being advanced at a slower rate than write pointer 310, the number of frames by which the read pointer trails the write pointer will increase, which corresponds to an increasing delay time in frame delay buffer 308. When the delay time corresponds to the estimated total maximum question-response delay caused by network delay, the advance rate of read pointer 314 is adjusted to match that of write pointer 310. At the beginning of the live interview segment, pause analysis program 306 is invoked, and excess question-response delays are removed from the buffered data frames. In certain exemplary embodiments, the time stretching component can be used to adjust the pitch of the audio component of the broadcast data such that the data that is broadcast while read pointer 314 is advanced at the slower rate still sounds normal.

FIG. 6 illustrates a block diagram of a computing system 600 in which live broadcast skip delay system 300 may be implemented, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing system 600 includes computer processor(s) 604, random access memory (RAM) 606, read-only memory (ROM) 608, persistent storage 610, device drivers 614, and network adapter or interface 616, all interconnected over communications fabric 602. Communications fabric 602 can be implemented with any architecture designed for passing data and/or control information between processors (such as microprocessors, communications and network processors, etc.), system memory, peripheral devices, and any other hardware components within a system. RAM 606, ROM 608, and persistent storage 610 are computer-readable tangible storage media. In general, RAM 606 and ROM 608 can include any suitable volatile or non-volatile computer-readable storage media. In certain embodiments of the invention, frame delay buffer 308, write pointer 310, analyze pointer 312, read pointer 314, and skip pointers 316 can be implemented in RAM 606.

Operating system(s) 612 and pause analysis program 306 are stored in persistent storage 610 for execution by one or more of processors 604 via one or more of RAM 606 and ROM 608. In this embodiment, persistent storage 610 includes a magnetic hard disk drive. Alternatively, or in addition to a magnetic hard disk drive, persistent storage 610 can include a solid state hard drive, a semiconductor storage device, ROM, erasable programmable read-only memory (EPROM), flash memory, or any other computer-readable storage media that is capable of storing program instructions or digital information. The media used by persistent storage 610 may also be removable. For example, a removable hard drive may be used for persistent storage 610. Other examples include optical and magnetic disks, thumb drives, and smart cards that are inserted into a drive for transfer onto another computer-readable storage medium that is also part of persistent storage 610.

Network adapter or interface 616 provides for communications with other data processing systems or devices, and may include one or more network interface cards. Network adapter or interface 616 may provide communications through the use of either or both of physical and wireless communications links. Operating system(s) 612 and pause analysis program 306 may be downloaded to persistent storage 610 through network adapter or interface 616. In certain embodiments of the invention, video or audio data frames are received and transmitted via network adapter or interface 616.

Device drivers 614 allow for input and output of data with other devices that may be connected to computing system 600. For example, device drivers 614 may provide a connection to devices such as a keyboard 620, mouse 622, display screen 618, and/or other suitable input devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method and program product have been disclosed for removing network latency effects during a "live" broadcast. However, numerous modifications and substitutions can be made without deviating from the scope of the present invention. Therefore, the present invention has been disclosed by way of example and not limitation.

What is claimed is:

1. A computer program product for removing excess pauses in a live broadcast caused by network delays, the computer program product comprising:

one or more non-transitory computer-readable storage media and program instructions stored on the one or more non-transitory computer-readable storage media, the program instructions comprising:

program instructions to receive a first stream of audio data into a buffer;

program instructions, in response to identifying a pause in the audio data having a duration longer than a predefined natural response delay, to create a skip pointer in the buffer that links a position in the buffer, corresponding to a time in the pause corresponding to the end of a delay having a duration of the predefined natural response delay, to the end of the pause;

program instructions to transmit a second stream of audio data from the buffer comprising the first stream of audio data, wherein if a skip pointer is encountered in the buffer, continuing the transmission at the position in the frame delay buffer skipped by the pointer; and wherein transmission the second stream of audio data begins after a predefined delay that is an estimation of the duration of the skipped portion of the pause.

2. A computer program product in accordance claim 1, further comprising:

program instructions, in response to identifying a plurality of excess pauses in the audio data having durations longer than a predefined natural response delay, to create skip pointers in the buffer that link a position in the buffer, corresponding to a time in each pause corresponding to the end of a delay having a duration of the predefined natural response delay, to the end of the pause;

program instructions to transmit the second stream of audio data from the buffer comprising the first stream of audio data, wherein if a skip pointer is encountered in the buffer, continuing the transmission at the position in the frame delay buffer skipped by the pointer; and wherein transmission of the second stream of audio data begins after a predefined delay that is an estimation of the duration of the sum of the skipped portions of the pauses.

3. A computer program product in accordance with claim 1, further comprising:

program instructions to receive the first stream of audio data at a first data rate; and program instructions to transmit the second stream of audio data at a second data rate that is slower than the first data rate, such that when the identified pause is encountered in the first stream of audio data, the second stream of audio data is being transmitted with a delay equal to the estimated duration of the skipped portion of the pause.

4. A computer program product in accordance with claim 1, further comprising:

program instructions to receive the first stream of audio data at a first data rate; and program instructions to transmit the second stream of audio data at a second data rate that is faster than the first data rate in response to determining that the estimated duration of the skipped portion of the pause is greater than the duration of the skipped portion of the pause.

5. A computer system for removing excess pauses in a live broadcast caused by network delays, the computer system comprising:

one or more computer processors, one or more computer-readable storage media, and program instructions stored on the computer-readable storage media for execution by at least one of the one or more processors, the program instructions comprising:

program instructions to receive a first stream of audio data into a buffer;

program instructions, in response to identifying a pause in the audio data having a duration longer than a predefined natural response delay, to create a skip pointer in the buffer that links a position in the buffer, corresponding to a time in the pause corresponding to the end of a delay having a duration of the predefined natural response delay, to the end of the pause;

program instructions to transmit a second stream of audio data from the buffer comprising the first stream of audio data, wherein if a skip pointer is encountered in the buffer, continuing the transmission at the position in the frame delay buffer skipped by the pointer; and wherein transmission the second stream of audio data begins after a predefined delay that is an estimation of the duration of the skipped portion of the pause.

6. A computer system in accordance claim 5, further comprising:

program instructions, in response to identifying a plurality of excess pauses in the audio data having durations longer than a predefined natural response delay, to create skip pointers in the buffer that link a position in the buffer, corresponding to a time in each pause corresponding to the end of a delay having a duration of the predefined natural response delay, to the end of the pause;

program instructions to transmit the second stream of audio data from the buffer comprising the first stream of audio data, wherein if a skip pointer is encountered in the buffer, continuing the transmission at the position in the frame delay buffer skipped by the pointer; and wherein transmission of the second stream of audio data begins after a predefined delay that is an estimation of the duration of the sum of the skipped portions of the pauses.

7. A computer system in accordance with claim 5, further comprising:

program instructions to receive the first stream of audio data at a first data rate; and program instructions to transmit the second stream of audio data at a second data rate that is slower than the first data rate, such that when the identified pause is encountered in the first stream of audio data, the second stream of audio data is being transmitted with a delay equal to the estimated duration of the skipped portion of the pause.

8. A computer system in accordance with claim 5, further comprising:

program instructions to receive the first stream of audio data at a first data rate; and program instructions to transmit the second stream of audio data at a second data rate that is faster than the first data rate in response to determining that the estimated duration of the skipped portion of the pause is greater than the duration of the skipped portion of the pause.

* * * * *